Feb. 27, 1923.
L. M. BARKER
1,447,006
METHOD AND APPARATUS FOR CONCENTRATION OF ORE
Filed Nov. 15, 1920
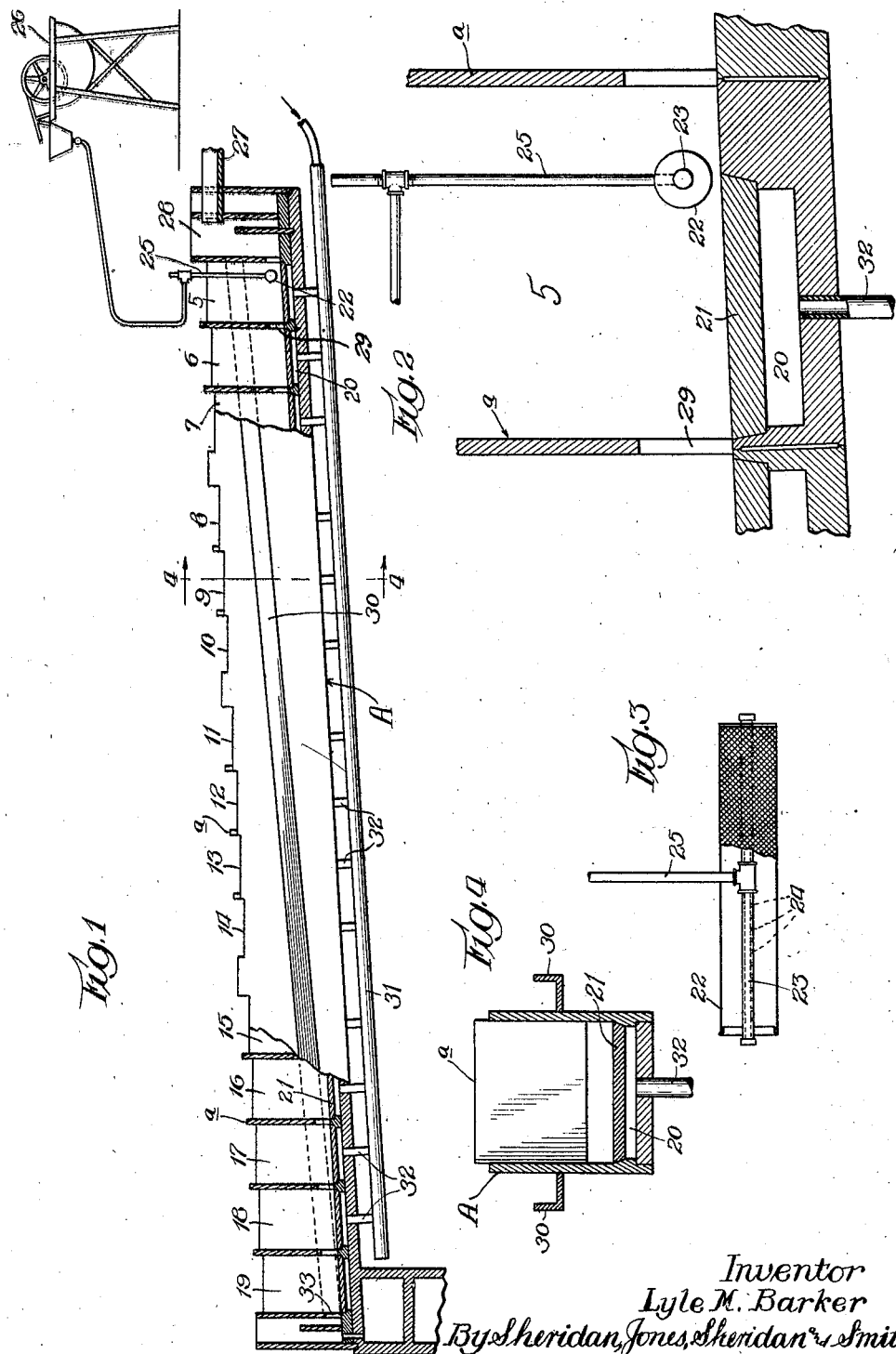
Inventor
Lyle M. Barker
By Sheridan, Jones, Sheridan & Smith
Atty's.

Patented Feb. 27, 1923.

1,447,006

UNITED STATES PATENT OFFICE.

LYLE M. BARKER, OF HAYDEN, ARIZONA.

METHOD AND APPARATUS FOR CONCENTRATION OF ORE.

Application filed November 15, 1920. Serial No. 424,009.

*To all whom it may concern:*

Be it known that I, LYLE M. BARKER, a citizen of the United States, residing at Hayden, in the county of Gila and State of Arizona, have invented certain new and useful Improvements in Methods and Apparatus for Concentration of Ore, of which the following is a specification.

This invention relates to the concentration of metal-bearing ore, particularly sulphide ore and ores containing copper, by the so-called flotation process, wherein a pulp consisting of a mixture of finely divided ore and water in the presence of a modifying agent, such as oil and the like, is subjected to direct aeration, as in the so-called bubbles column process, without mechanical agitation to emulsify the oil or beat in air, to cause the flotation and separation of the ore values.

My present invention is based on the discovery that an efficient flotation and separation of ore values can be had by producing an oil film in the body of the pulp by means of a screen from which globules of oil are formed in the pulp, and then subjecting the mass to the direct action of a gas—preferably air introduced therein so as to cause the flotation and separation of the metalliferous matter from the gangue, all of which will be more fully hereinafter set forth.

At times considerable difficulty is met in the feeding of the modifying reagent, such as oil, into the flotation cells and the dispersal of the same throughout the flowing pulp, due to the character of the reagent and the methods of dispersal. My invention is primarily intended to overcome this objection and to provide an economical and efficient method and means of feeding and disseminating the modifying reagent throughout an ore pulp so as to modify the same and render it susceptible to concentration by direct aeration, as in the bubbles column process. For the purpose of disclosing my invention I have shown and described it in connection with an aerating cell, so that those conversant with this art may be informed in such manner as will enable them to install the apparatus and practise the invention.

In the accompanying drawings—

Fig. 1 is a longitudinal sectional elevation of an aerating concentration flotation cell made in accordance with my improvements;

Fig. 2, an enlarged detail of the first chamber thereof;

Fig. 3, a detail of the oil dispersing device, and

Fig. 4 is an enlarged cross-sectional view of the aerating cell, taken on line 4—4 of Fig. 1.

In constructing an aerating flotation cell for the purpose of practising my invention, one in which the bubbles column process may be practised, I provide an aerating concentrating cell A of any usual form of construction, preferring the type shown in Fig. 1, in which there are arranged a series of several compartments as indicated at 5, 6, 7, 8, 9, 10, 11, 12, 13, 14, 15, 16, 17, 18 and 19, separated from each other by partitions $a$. The aerating cell for purposes of economy and efficiency is divided into several compartments as shown and described, so as to insure a proper aeration of the modified pulp, as will be more fully hereinafter set forth. The side walls of the cells are not perforated and may be made of any desired material so as to get the proper size and proportion of cells for the direct aerating process. The bottom portion of each of the chambers is provided with an air chamber 20, the upper walls 21 of which are formed of some desirable permeable medium, such, for instance, as concrete, though any other well known material may be used for the purpose.

The oil for modifying the pulp of finely divided ore and water is fed into the first chamber 5 of the aerating cell into and through a screened cylinder 22 located therein slightly above the bottom portion thereof as shown in Figs. 1 and 2. This screened cylinder, as made and used by me, is composed of an outer cylindrical screen of approximately 18 mesh, about three inches in diameter and three feet long. A central longitudinal perforated oil pipe 23 is arranged therein, of one-half inch in diameter, about three feet long, with perforations 24 of $\frac{1}{16}$ inch in diameter located approximately one inch apart. A supply pipe 25 is connected with the perforated oil pipe at its lower end, and with an oil feed and measuring device 26, of common construction, at the upper end, so that the oil may be fed into the screened cylinder by gravity and in such amounts as appears desirable and necessary, all of which will be understood and appreciated by those skilled in the art. When an oil of gravity lower than water is used and introduced into the screened cylinder as set forth above, it will take the form of globules, which will rise through the water until they come into contact with the screen; here they will adhere to the screen and spread over a considerable area of the same. From my observations, free globules of oil will separate from these attachments and rise to the surface of the pulp after the quantity of oil in the attachments has reached a maximum determined by the factors of adhesion, gravity and surface tension of liquid involved, all of which can be easily determined by those skilled in this particular art. If oils of a greater gravity than water be employed, the direction of travel of the oil globules is downwards, but their action in coming in contact with the screen is precisely the same as that described in connection with the lighter gravity oils; in either case contact of the oil globules with the screen insures, first, the formation of a film of oil and a subsequent efficient dispersal of the desired oil globules through the pulp.

In operation, the pulp composed of finely divided ore and water in the usual proportions is fed through the launder 27 into the distributing box 28 at the entrance of the first chamber 5 of the aerating cell, from which it passes through the series of chambers thereof—that is, through the opening 29 underneath each of the dividing partitions a of the same. The pulp usually reaches a level somewhat below the upper edge of the side walls of the cells so as to permit of the formation of the proper "bubbles column" on the surface thereof. The air for flotation purposes is supplied directly to the air chambers 20 by means of the air supply pipe 31 and the branches 32 thereof at the bottom of each compartment, and passing through the porous upper walls 21 thereof enters the pulp in a multiplicity of fine streams of air bubbles. The bubbles of air rising through the mass of the modified pulp come into contact with the solid matter and carry a considerable portion thereof to the surface, where they act to form a column of bubbles on the surface of the pulp, in which the final separation of the metalliferous matter from the gangue takes place. The bubbles column, after it has reached a certain height, flows with its metallic load over the upper edge of the side walls of the cell, where it may be caught in any convenient manner, as in the side launders 30, and led to storage chambers or to other mechanisms for further treatment as may be desired, while the tails pass out through an opening 33 in the lower portion of the last compartment 19, to waste or further treatments, as may appear necessary or desirable.

In experimental and practical tests, I have used my improvements in connection with the ores of the Ray Consolidated Copper Company of Arizona, in the mills of said company located at Hayden, Arizona,—which ores had an average heading of .60% cu. The oils which I have found as giving excellent results are a mixture of what is known to the trade as 70% No. 20 Reilly and 30% No. 1 Cleveland Cliffs. The average amount of oils used, expressd in pounds per ton of ore treated, was 1.00.

When using certain oil mixtures under certain conditions I am enabled to dispense with the screen 22, a perforated pipe serving to introduce the oil properly into the pulp mixture.

I claim:

1. The improved process of diffusing an oily reagent in pulp undergoing concentration of the pneumatic flotation type, which consists in presenting said reagent to the pulp in the form of a thin liquid film formed across the reticulations of a finely reticulated material.

2. The improved process of diffusing an oily reagent in pulp undergoing concentration of the pneumatic flotation type, which consists in spraying said reagent through the reticulations of a finely reticulated material in such wise as to cause the same to be presented to the pulp in the form of a thin liquid film on the outer surface of said material.

3. In apparatus of the class described, the combination with a froth flotation cell of the pneumatic type having means for diffusing gas in the lower portion thereof, of a finely reticulated oily reagent diffuser adapted to present a thin liquid film of the reagent to the pulp in the region of uprising gas bubbles.

4. In apparatus of the class described, the combination with a froth flotation cell of the pneumatic type having means for diffusing gas in the lower portion thereof, of a finely reticulated oily reagent diffuser adapted to present a thin liquid film of the reagent to the pulp in the region of uprising gas bubbles, and means for delivering the oily reagent to said diffuser.

5. In apparatus of the class described, the combination with a froth flotation cell of the pneumatic type having means for diffusing gas in the lower portion thereof, of a finely reticulated oily reagent diffuser adapted to present a thin liquid film of the reagent to the pulp in the region of uprising gas bubbles, and a perforate member associated with said diffuser for delivering the oily reagent thereto in the form of a spray.

6. In apparatus of the class described, the combination with a froth flotation cell of the pneumatic type having means for diffusing gas in the lower portion thereof, of an oily reagent receiving and diffusing chamber formed of finely reticulated material located near the bottom of said cell and adapted to present a thin liquid film of the reagent to the pulp, and means for supplying said reagent to said chamber in the form of a spray.

In testimony whereof, I have subscribed my name.

LYLE M. BARKER.